Sept. 18, 1934.  W. L. STONEHOUSE  1,974,221
FOWL AND MEAT CARVING TRAY
Filed Nov. 9, 1931
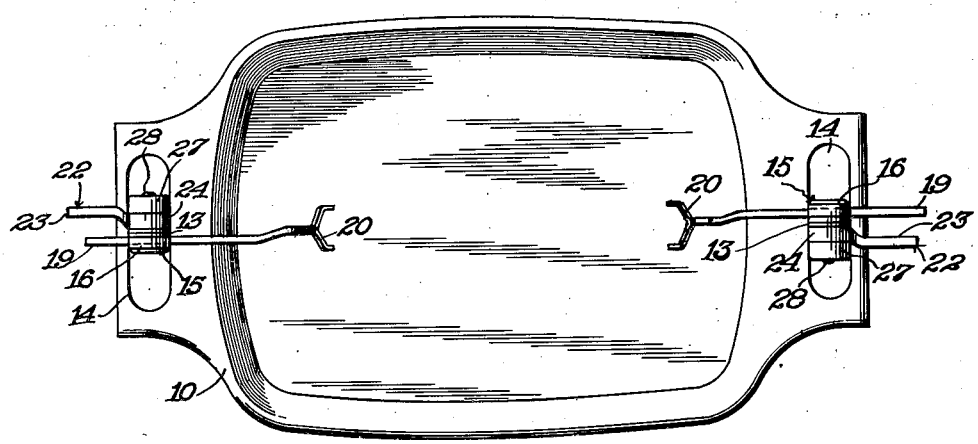
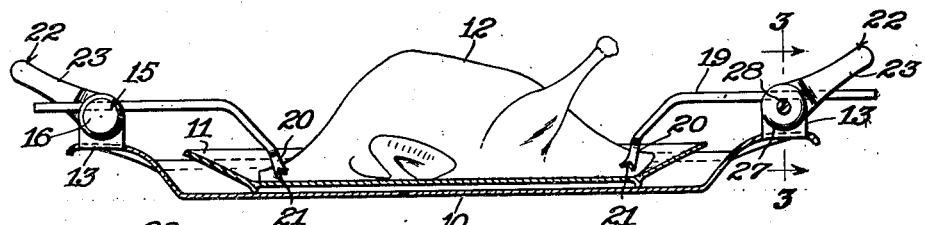
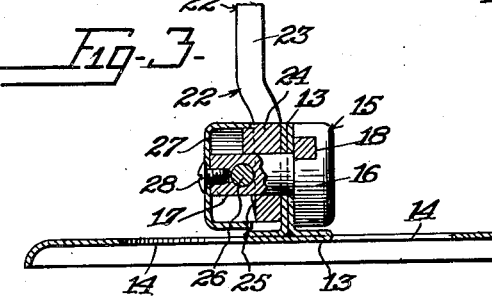
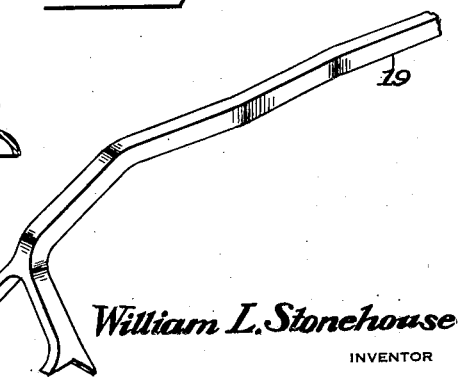
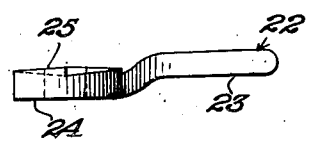
William L. Stonehouse
INVENTOR
BY Victor J. Evans &Co.
ATTORNEY Patented Sept. 18, 1934

1,974,221

UNITED STATES PATENT OFFICE 1,974,221

FOWL AND MEAT CARVING TRAY

William L. Stonehouse, Detroit, Mich.

Application November 9, 1931, Serial No. 574,012

6 Claims. (Cl. 65—15)

This invention relates to table implements or utensils and has for its general object the provision of novel means for positively clamping and holding down a fowl or cut of meat to be carved upon a platter or tray, the advantage of course being that the object is held firmly so that it cannot slip about while the carver is working upon it.

A further important object of the invention is to provide a carving tray adapted to have placed therein an ordinary serving platter upon which the fowl or meat is disposed, the tray being equipped with clamping means adapted to engage the neck and tail of a fowl or pass through the same and grip the backbone, or engage with opposite end portions of a steak, roast or the like to be sliced or otherwise cut.

Another specific object is to provide a carving tray of this character embodying novel cam means for locking the clamping members positively in position, so that the carver's hands will be free for the work of removing the meat from the fowl, slicing a roast or the like.

Still further objects are to provide a device of this character which will be simple and inexpensive to make, easy to use, neat and attractive in appearance, positive in action, efficient and durable in service, and a general improvement in the art.

With the above and other objects and advantages in view, the invention preferably consists in the details of construction and the arrangement and combination of parts to be hereinafter more fully described and claimed, and illustrated in the accompanying drawing, in which Figure 1 is a plan view of the complete device.

Figure 2 is a longitudinal section therethrough showing the device in use for holding down a fowl to be carved.

Figure 3 is a detail cross section taken on the line 3—3 of Figure 2.

Figure 4 is a detail side elevation of one of the locking cams, and

Figure 5 is a perspective view of one of the clamping arms or forks.

Referring more particularly to the drawing, I have shown the device as comprising a tray 10 which may be constructed of any suitable material, preferably of metal finished in any desired manner. This tray is intended to be of sufficient size to receive and contain an ordinary platter 11 such as is used in serving fowls, roasts and the like. In the present instance the platter 11 is represented as containing a fowl 12 to be carved. The tray might of course be used as a platter if desired, however, or the securing devices attached directly to a platter of any desired style.

At each end of the tray 10 is a support 13 which may be formed of double ears struckout or stamped from the material of the tray itself and mashed or pressed together as clearly illustrated in Figure 3. The formation of this support naturally leaves openings 14 in the end portions of the tray by means of which it may be conveniently handled. Carried by each of the supports 13 is a rotatable member indicated as a whole by the numeral 15 and including a head 16 and a reduced cylindrical shank 17, the latter being rotatable through a suitable hole in the support 13 and the former being formed with a preferably rectangular notch 18 extending across its inner face, that is to say the face from which the shank 17 extends. Slidably engaged within each notch 18 is the elongated rectangular shank 19 of a holding member formed as a fork 20 having tines 21 capable of penetratingly engaging a cut of meat to be held. These forks 20 are of such shape as to be capable of engagement with the neck and tail of a fowl for the purpose of holding it down firmly upon the platter 11 as clearly illustrated in Figure 2. The forks are slidable within the notches 18 so that they may be adjusted and brought into proper position to grip fowl and cuts of various sizes.

It is of course obvious that some means must be provided for holding the forks down in clamping engagement with the fowl or of meat, and I preferably provide therefor locking members indicated as a whole by the numeral 22 and including elongated handles or levers 23 projecting from heads 24, the latter being formed with inclined or cam faces 25 reacting against transverse pins 26 extending through the shanks 17 of the members 15. I also preferably cover the shank end of each clamping unit with a cap 27 of substantially the same size and appearance as the head 16. The cap extends over the end of the shank 17 and a portion of the cam-carrying head 24 of the locking device, and is shown secured in place by a screw 28 passing through its center and axially into a threaded or tapped hole or socket in the projecting end of the shank 17.

In the use of the device, it is of course apparent that a platter 11 carrying the fowl 12, or cut of meat, may or may not be placed upon the tray 10 as desired. When the levers 23 of the locking devices are in their upwardly extended positions it is clear that there will be no pressure exerted by cams 25 against the pins 26, and so no clamping action between the heads 15, shanks 19 and supports 13. Such being the case it is a simple matter for the operator to adjust the forks 20, by moving them toward or away from each other and by swinging them upwardly or downwardly while the member 15 pivots upon its shank 17, so that they will be brought into engagement, for instance, with the neck and tail of the fowl 12, or into penetrating engagement with opposite ends of a roast or other piece of meat to be served. The locking levers 23 may then be moved downwardly so that the cam faces 25 on the heads 24, reacting against the transverse pins 26, jam the shanks 19 of the forks against the supports 13, thereby holding the forks firmly against sliding movement. At the same time this clamping action prevents any rotation of the members 15 with respect to the support 13. The fowl or piece of meat will thus be so positively and firmly clamped down as to make it virtually impossible for it to slip or slide about upon the platter or tray. Clearly when the fowl or piece of meat is thus held down it is a simple matter for one to carve it as both hands are free and as the meat or fowl is held rigidly. In the case of young fowl the tail and neck may not be strong enough to stand the strain, in which event the clamping arms may be forced through the neck and tail so as to grip the backbone.

From the foregoing description and a study of the drawing it will be apparent that I have thus provided a very simply constructed, inexpensive and yet highly useful device for the purpose specified and one which will greatly facilitate and expedite the work of carving meat, poultry and the like. It is thought that the construction, operation and advantages should be readily apparent to one skilled in the art without further explanation.

While I have shown and described the preferred embodiment of the invention, it should be understood that I reserve the right to make all such changes in the details of construction and the arrangement and the combination of parts as will not depart from the spirit of the invention or the scope of the subjoined claims.

Having thus described the invention I claim:

1. In a device for supporting and securing a homogeneous article of food, a receptacle, supporting members at the ends thereof, elongated clamping members slidable horizontally and pivoted upon said supporting members and relatively close to the receptacle for vertical swinging movement, and locking members cooperating with said clamping members for simultaneously securing the same against movement in either direction.

2. In a device of the character described, comprising a receptacle provided at each end with a fixed support, an elongated clamping member pivotally carried by each support, disposed relatively close to the receptacle and adapted for engagement with an article therein, said clamping members being slidably adjustable horizontally with respect to the supports and swingable vertically, and locking means engageable with both the supports and clamping members for holding said members against both pivotal and sliding movement.

3. In a device of the character described, a receptacle adapted to contain an article to be held, an upstanding fixed support at each end of the receptacle, a prong-carrying element carried by each support and rotatable about a substantially horizontal axis, a prong member slidable in said element and adapted for engagement with the object desired to be held, and cam locking members associated with each fixed support for locking both the prong member and prong-carrying element against undesired movement.

4. In a device of the character described, a receptacle provided at each end with an upstanding support, a member carried by each support and including a head and further including a shank rotatable through the support, the head being provided at its side toward the support with a transverse notch, a fork-like clamping member having its shank slidably engaged within the notch, said member being rotatable with respect to the support, an element extending transversely with respect to said shank, and a locking cam rotatable upon the shank and cooperating with said element and with said head for locking said shank of the fork against undesired movement and for locking said head against rotary movement.

5. Means for supporting and securing in position an article of food, comprising a sheet metal receptacle, a pair of clamping members carried adjacent the edges thereof, and means for securing the clamping members, comprising portions struck out of the metal adjacent the edge of the receptacle and bent to form supports for the clamping members, and being similarly and oppositely arranged near the edge of the tray so that the apertures thereby left together with the surrounding metallic portions of the receptacle form handles for lifting the same.

6. In a device for supporting and securing in position an article of food, a sheet metal receptacle, clamping members arranged upon opposite edges thereof, and means for securing each clamping member to the receptacle comprising a pair of oppositely arranged tangs struck out of the metal of the receptacle near an edge and bent upwardly to form an upwardly projecting bracket integral therewith, and whereby the openings thereby left cooperate with the surrounding metal of the receptacle to form a handle therefor.

WILLIAM L. STONEHOUSE.